Patented Oct. 12, 1948

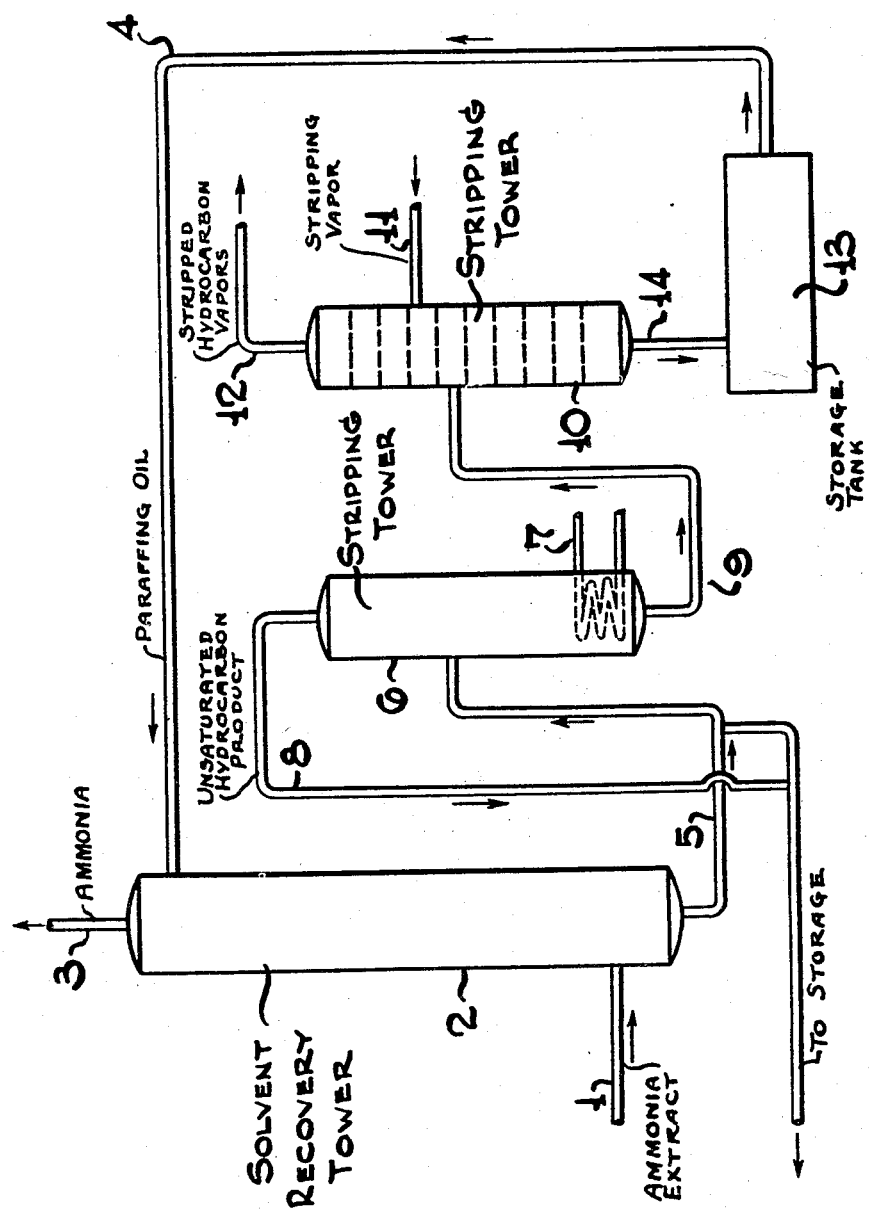

2,451,050

UNITED STATES PATENT OFFICE 2,451,050

OLEFIN EXTRACTION

Carl O. Tongberg, Westfield, N. J., assignor to Standard Oil Development Company, a corporation of Delaware Application November 24, 1945, Serial No. 630,679

7 Claims. (Cl. 260—681.5)

1

This invention relates to improvements in the separation and recovery of mono-olefins and diolefins separated by means of solvents from hydrocarbon mixtures containing mono-olefins and diolefins.

It is known that mineral oils, such as petroleum oils, contain various types of hydrocarbon compounds which may be generally classified as having paraffinic, aromatic, naphthenic and unsaturated structures which vary over wide ranges in molecular weight. It is also known to segregate these compounds into relatively more paraffinic, more aromatic and more unsaturated fractions by means of various selective solvents or solvent mixtures. The separation of the more viscous oils is usually accomplished by means of an organic solvent selected from the class of solvents which have a preferential selectivity for the relatively less paraffinic type compounds. The solvents used are generally phenol, furfural, cresols, nitrobenzene, aniline, beta beta' dichlorodiethyl ether, and the like. In these solvents or solvent mixtures the paraffinic type hydrocarbons are the least soluble, the naphthenic next, and the aromatic and unsaturated hydrocarbons the most soluble. Temperature and pressure conditions are adjusted to secure the formation of solvent-poor, or raffinate phase, and solvent-rich, or solvent extract phase. The respective phases are then separated and handled in a manner to remove the solvent from the extract and the raffinate. This is usually accomplished by distillation processes, providing a sufficient differential exists between the boiling points of the solvent and the oil. Other means are also employed, as, for example, re-extraction with a secondary solvent, as by washing with water and the like.

These organic solvents and extraction processes, while entirely satisfactory for securing a separation between the more relatively aromatic fractions and the relatively more paraffinic fractions, are not completely desirable for the separation of the particular constituents from mixtures containing constituents of a similar chemical structure, that is, the separation of the diolefins from mono-olefins.

Various inorganic and mineral acids, in conjunction with their salts of copper and silver, have been used for the separation of the diolefins and mono-olefins. Other solvents that have been used are liquefied normally gaseous inorganic solvents of the character of sulfur dioxide and liquid anhydrous ammonia. Where liquefied ammonia and sulfur dioxide have been used

2 alone various disadvantages have arisen, such as the formation of sulfones with the sulfur dioxide, and the limited range of solvent power of the ammonia. Improved results were obtained using liquid ammonia with a substance characterized by having the ability to increase the solvent power of the ammonia within definite critical limits, or a substance having the ability to decrease the solvent power of the ammonia within definite critical limits.

The segregation of substantially pure diolefins from a mixture of diolefins, mono-olefins and paraffins is generally best accomplished by the use of two extraction zones, namely, a stripping zone to remove the diolefins preferentially from the feed mixture of diolefins, mono-olefins and paraffins, and an enriching zone to separate and purify the diolefins thus removed in an extract from the other components which are, of necessity, dissolved at the same time, but to a minor degree, in the extract. In order to obtain a high recovery of diolefins it is necessary to extract them from the feed hydrocarbons. In view of the widely different solubility of mono-olefins, paraffins and diolefins in the ammonia solvents, it is frequently desirable to use different concentrations or different modifying solvents in the two zones of extraction. For example, ammonia and a relatively saturated hydrocarbon oil (paraffinic oil) or ammonia, water, and a relatively saturated oil in which the concentration of the modifying solvents, water and the oil is different in the two zones may be used as the solvents. In other instances it is desirable to employ in the stripping section ammonia together with solvents to increase the dissolving power, such as methylamine, in order to be able to remove completely the diolefins from the feed. In this case a solvent to reduce the dissolving capacity of the ammonia solvent is usually used at one or more points in the enriching section in order to purify the diolefins.

The solubility of the individual components in a given ammonia solvent is dependent not only upon the type of the component, but also upon its molecular weight. For a given type the lower molecular weight compounds are in general more soluble. For example, it has been found that butadiene is soluble in ammonia solvent at 60° F. to the extent of eleven per cent. Isoprene dissolved in this same solvent at the same temperature to the extent of only six per cent. Propylene was soluble to the extent of five per cent; whereas less than one per cent of the amylenes were dissolved.

These properties of the ammonia solvents broaden their use in some instances, but restrict them in others. For example, these solvents may be used to prepare butadiene as a substantially pure extract, while any polymerization products would be rejected in the raffinate. On the other hand, the feed oil must not be too broad in molecular weight, as otherwise the lighter mono-olefins would have the same solubility as the heavier diolefins and would contaminate the extract. In extracting a cut containing from three to six carbon atom hydrocarbons, some propylene would be dissolved along with the six carbon atom diolefins; hence, pure diolefins would not be obtained. In general, it is preferred that the molecular weight range of the feed oil be within 15 to 30 units. Oils boiling in the range below the boiling range of light lubricating oil fractions, and especially desirable in the segregation of relatively pure diolefin constituents, with from three to twelve carbon atoms per molecule, are particularly adapted for this process.

Where liquid ammonia with a methylamine modifier is used in the extraction of mono-olefins from paraffins, or of diolefins from mono-olefins, an extract of mono-olefins or diolefins in the liquid ammonia with a methyl amine modifier is obtained. According to this invention the diolefins or mono-olefins, are removed from the solvent ammonia by countercurrent extraction with a paraffinic oil of high boiling range and preferably one having a Saybolt viscosity ranging from about 50 to 150 seconds at 100° F.

It is much more economical to separate the mono-olefins from the solvent ammonia by such an extraction process than it is to separate the components by distillation, the principal saving being in heat that would be required to vaporize the ammonia.

The recovery of the $C_4$ hydrocarbons from the paraffinic oil is partially accomplished by heat stripping with closed steam or electric heat. However, a small amount of the $C_4$ hydrocarbons will remain behind in the paraffinic oil. This may be removed by the use of live steam but the use of live steam has the disadvantage that small amounts of water remain in the paraffinic oil which may get in the anhydrous ammonia stream and alter its solvent characteristics, and in low temperature extractions, freeze up the lines. To prevent such occurrences, according to this invention, the paraffinic oil is stripped with a low boiling inert material, such as pentane or hexane, in place of the live steam. The small amount of the hydrocarbon, pentane or hexane, which remains dissolved in the paraffin oil would not be serious and can be recirculated with the paraffin oil. Where $C_5$ or higher hydrocarbons are extracted a somewhat higher boiling paraffin can be used as the stripper.

The invention will be more clearly understood upon reading the following description with reference to the accompanying drawing:

An extract of $C_4$ hydrocarbons obtained by treating a mixture of hydrocarbons having four carbon atoms to the molecule, and containing mono-olefins and diolefins, with ammonia and a modifier, methylamine, is passed by means of pipe 1 into the solvent recovery tower 2 where the temperature is raised sufficiently high to expel ammonia by means of pipe 3. A paraffinic oil is introduced into the upper part of the tower 2 by means of pipe 4 and passed in countercurrent flow to the ammonia whereby the ammonia is freed of the $C_4$ hydrocarbons. The modifier, in this case methylamine, is separated with the ammonia. The paraffinic oil, substantially free of ammonia and containing the extracted $C_4$ hydrocarbons, is then passed from tower 2 by means of pipe 5 to stripping tower 6, which is heated by means of closed steam coil 7, and the major portion of the $C_4$ hydrocarbons liberated by the heat is passed, by means of pipe 8, to storage, and a fraction may be recycled through pipe 15 to pipe 5 as a reflux. The paraffinic oil, from which most of the $C_4$ hydrocarbons have been removed, is then passed through pipe 9 to the middle of stripping tower 10 into which is introduced a saturated hydrocarbon boiling between 96 to 160° F., in this case pentane or hexane, by means of pipe 11, the pentane or hexane being maintained in the upper part of the tower 10 while $C_4$ hydrocarbons are passed from the stripping tower by means of pipe 12, the paraffinic oil, free of $C_4$ hydrocarbons, being removed to storage tank 13 by means of pipe 14 from which the paraffinic oil may be recycled to the solvent recovery tower 2. The pentane or hexane is retained in the tower 10 though a part may pass out with the paraffinic oil and be recirculated, and more of the pentane or hexane is added to maintain a definite volume. When higher boiling hydrocarbons are extracted higher boiling solvents are used.

The paraffinic oil used, according to this invention, may have a specific gravity of about 0.82 to 0.86 and a Saybolt viscosity of 50 to 100 seconds at 100° F. but is preferably one having a specific gravity at 60° F. of about .845 to .855, with a Saybolt viscosity at 100° F. of 80 to 90 seconds, and a Pensky flash of 350° F. It is not intended to limit this invention to these particular physical characteristics as a lighter or heavier paraffinic oil may be used, preferably one with an initial boiling point of at least 450° F.

What is claimed is:

1. In the extraction and segregation of an olefin having 4 to 5 carbon atoms to the molecule, from a mixture of hydrocarbons having a molecular weight not over 98 and containing an olefin where ammonia and a modifier that increases the solvent power of the ammonia is used as a solvent to obtain an extract of the olefin in the ammonia, the following steps which comprise passing the ammonia extract containing the olefin having from 4 to 5 carbon atoms to the molecule, in countercurrent flow to a paraffinic oil of high boiling range, and a Saybolt viscosity of at least 50 seconds at 100° F., separating the paraffinic oil from the ammonia and modifier, heating the paraffinic oil to expel the major fraction of the olefin, and then separately stripping the residual paraffinic oil with a saturated hydrocarbon boiling at a higher temperature than the olefin and within a range of 96° F. to 160° F. to obtain overhead the olefin having 4 to 5 carbon atoms to the molecule and, as a residue, paraffinic oil substantially free of the olefin.

2. In the extraction and segregation of a diolefin having from 4 to 5 carbon atoms to the molecule, from a mixture of hydrocarbons whose molecular weight differences between the highest and lowest molecular weight hydrocarbon compounds are not over 30, and containing a diolefin having 4 to 5 carbon atoms to the molecule, where ammonia and a modifier, methyl amine, that increases the solvent power of the ammonia is used as a solvent to obtain an extract of the diolefin in the ammonia, the following steps which comprise passing the ammonia extract containing the diolefin in countercurrent flow to a paraffinic oil having a high boiling range, and a Saybolt viscosity at 100° F. of at least 50 seconds, separating the paraffinic oil from the ammonia and modifier, heating the paraffinic oil to expel the major fraction of the diolefin, having 4 to 5 carbon atoms to the molecule, and separately stripping the residual paraffinic oil with a saturated hydrocarbon boiling at a higher temperature than the said diolefin and not over 160° F. to obtain overhead a diolefin having 4 to 5 carbon atoms to the molecule, and a residue paraffinic oil substantially free of the olefin.

3. In the extraction and segregation of an olefin from a mixture of hydrocarbons having a molecular weight difference of not over 30 between the highest and lowest molecular weight components thereof and containing olefin where ammonia and a modifier that increases the solvent power of the ammonia is used as a solvent to obtain an extract of the olefin in the ammonia, the following steps which comprise passing the ammonia extract containing the olefin in countercurrent flow to a paraffinic oil having an initial boiling point of at least 450° F. and a Saybolt viscosity at 100° F. of 80 to 90 seconds, separating the paraffinic oil from the ammonia and modifier, heating the paraffinic oil to expel the major fraction of the olefin, and separately stripping the residual paraffinic oil with a saturated hydrocarbon boiling at a higher temperature than the olefin, and within a range of 96° F. to 160° F. to obtain overhead an olefin and, as a residue, paraffinic oil substantially free of the olefin.

4. In the extraction and segregation of olefin from a mixture of hydrocarbons having molecular weight differences within a range of 15 to 30 between the highest and lowest molecular weight components thereof, containing an olefin, where ammonia and methyl amine is used as a solvent to obtain an extract of the olefin in the ammonia, the following steps which comprise passing the ammonia extract containing the olefin in countercurrent flow to a paraffinic oil having an initial boiling point of at least 450° F. and a Saybolt viscosity at 100° F. of 80 to 90 seconds, separating the paraffinic oil substantially free of the ammonia and methyl amine, heating the paraffinic oil to expel the major fraction of the olefin and separately stripping the residual paraffinic oil with a saturated hydrocarbon boiling at a higher temperature than the said olefin, and within a range of 96° F. to 160° F. to obtain overhead an olefin and, as a residue, paraffinic oil substantially free of the olefin.

5. In the extraction and segregation of a diolefin from a mixture of hydrocarbons having molecular differences within the range of 15 to 30 between the highest and lowest molecular weight components thereof and containing a diolefin, where ammonia and methyl amine is used as a solvent to obtain an extract of the diolefin in the ammonia, the following steps which comprise passing the ammonia extract containing the diolefin in countercurrent flow to a paraffinic oil having an initial boiling point of at least 450° F. and a Saybolt viscosity at 100° F. of 80 to 90 seconds, separating the paraffinic oil substantially free of the ammonia and methyl amine, heating the paraffinic oil to expel the major fraction of the diolefin, and separately stripping the residual paraffinic oil with a saturated hydrocarbon boiling at a higher temperature than the olefin, and within a range of 96° F. to 160° F. to obtain overhead a diolefin and, as a residue, paraffinic oil substantially free of the diolefin.

6. In the extraction and segregation of a diolefin from a mixture of hydrocarbons containing a diolefin, according to claim 5, the saturated hydrocarbon used in stripping the paraffinic oil is pentane.

7. In the extraction and segregation of a diolefin from a mixture of hydrocarbons containing a diolefin, according to claim 5, the hydrocarbon used in stripping the paraffinic oil is hexane.

CARL O. TONGBERG.

REFERENCES CITED

The following references are of record in the file of this patent:

UNITED STATES PATENTS

| Number | Name | Date |
| --- | --- | --- |
| 991,205 | Hirzel | May 2, 1911 |
| 1,912,349 | Tuttle | May 30, 1933 |
| 2,114,524 | Egli | Apr. 9, 1938 |
| 2,396,299 | Sweeney et al. | Mar. 12, 1946 |
| 2,396,300 | Cummings et al. | Mar. 12, 1946 |
| 2,414,651 | Latchum | Jan. 21, 1947 |

FOREIGN PATENTS

| Number | Country | Date |
| --- | --- | --- |
| 526,387 | Great Britain | Sept. 17, 1940 |